US012458061B2

(12) United States Patent
Li et al.

(10) Patent No.: US 12,458,061 B2
(45) Date of Patent: *Nov. 4, 2025

(54) AUTOMATICALLY RESETTABLE TOBACCO HEATING DEVICE

(71) Applicant: CHINA TOBACCO YUNNAN INDUSTRIAL CO., LTD, Kunming (CN)

(72) Inventors: Zhiqiang Li, Kunming (CN); Donglai Zhu, Kunming (CN); Tinghua Li, Kunming (CN); Shoubo Li, Kunming (CN); Junheng You, Kunming (CN); Shanzhai Shang, Kunming (CN); Jingmei Han, Kunming (CN); Ping Lei, Kunming (CN); Dalin Yuan, Kunming (CN); Yunhua Qin, Kunming (CN)

(73) Assignee: CHINA TOBACCO YUNNAN INDUSTRIAL CO., LTD, Kunming (CN)

( * ) Notice: Subject to any disclaimer, the term of this patent is extended or adjusted under 35 U.S.C. 154(b) by 424 days.

This patent is subject to a terminal disclaimer.

(21) Appl. No.: 17/978,991

(22) Filed: Nov. 2, 2022

(65) Prior Publication Data

US 2023/0048042 A1 Feb. 16, 2023

Related U.S. Application Data

(63) Continuation of application No. 16/509,517, filed on Jul. 12, 2019, now Pat. No. 11,517,043.

(51) Int. Cl.

*A24F 13/10* (2006.01)
*A24F 40/40* (2020.01)

(Continued)

(52) U.S. Cl.

CPC .............. *A24F 13/10* (2013.01); *A24F 40/40* (2020.01); *H05B 3/0004* (2013.01); *H05B 3/06* (2013.01)

(58) Field of Classification Search

None

See application file for complete search history.

(56) References Cited

U.S. PATENT DOCUMENTS

| | | | | |
|---|---|---|---|---|
| 1,826,237 A * | 10/1931 | Boeckel | A24F 13/10 131/182 |
| 1,880,754 A * | 10/1932 | Briere | A24F 13/10 131/182 |

(Continued)

FOREIGN PATENT DOCUMENTS

| | | | |
|---|---|---|---|
| CN | 106617324 A * | 5/2017 | A24F 47/008 |
| CN | 107319640 A * | 11/2017 | A24F 40/40 |

(Continued)

OTHER PUBLICATIONS

English Translation of CN_108308708 (Year: 2018).*

(Continued)

*Primary Examiner* — Manley L Cummins, IV
(74) *Attorney, Agent, or Firm* — Bayramoglu Law Offices LLC

(57) ABSTRACT

An automatically resettable smoking paraphernalia includes the following components: an outer upper shell, a smoking cup provided inside the outer upper shell, a pushing key, and a spring, etc., wherein the smoking cup, the spring, the outer upper shell can be detached and replaced as a whole, the smoking cup can stick out of the outer upper shell by a distance to extract and unload the cigarette, and then automatically reset. Besides, the smoking cup is hidden inside the upper outer shell, so as to prevent the exposed smoking (Continued)

cup with an excessively high temperature from burning users, meanwhile avoiding a risk of losing the smoking cup.

12 Claims, 6 Drawing Sheets

(51) Int. Cl.
*H05B 3/00* (2006.01)
*H05B 3/06* (2006.01)

(56) References Cited

U.S. PATENT DOCUMENTS

2016/0007649 A1* 1/2016 Sampson .................. A24F 7/04 131/187
2018/0192691 A1* 7/2018 Richmond ............... A24D 1/20

FOREIGN PATENT DOCUMENTS

CN 107568803 A * 1/2018 ............. A24F 40/40
CN 108308708 A * 7/2018 ............. A24F 13/10
KR 20170106915 A * 9/2017 ............... H05B 3/42
WO WO-2019090655 A1 * 5/2019
WO WO-2019165591 A1 * 9/2019 ............. A24F 13/10

OTHER PUBLICATIONS

English Translation of WO_2019165591 (Year: 2018).*
English Translation of CN_106617324 (Year: 2017).*
English Translation of KR_20170106915 (Year: 2017).*
English Translation CN_107568803 (Year: 2018).*
English Translation of CN_107319640 (Year: 2017).*

* cited by examiner

AUTOMATICALLY RESETTABLE TOBACCO HEATING DEVICE

CROSS REFERENCE TO THE RELATED APPLICATION

The present invention is a continuation application of U.S. non-provisional application Ser. No. 16/509,517 filed on Jul. 12, 2019, the entire contents of which are incorporated herein for reference.

TECHNICAL FIELD

The present invention belongs to the field of novel cigarette products, specifically relates to an automatically resettable smoking paraphernalia.

BACKGROUND

With smoking paraphernalia products for novel cigarettes stepping into the market, feedback from consumers is increasingly detail-oriented, and higher requirements for the humanized designs targeting at various components of the smoking paraphernalia are raised. Thereinto, inserting and extracting cigarettes is a focus of research for the researchers. For the existing smoking paraphernalia products for novel cigarettes, a cigarette generally needs to be manually inserted, and the cigarette sticking out of the heating cavity is manually disassembled after smoking. The operation mode readily breaks the cigarette or makes fragments of the cigarette remain in the heating cavity, greatly increasing difficulties in the subsequent cleaning.

A Chinese patent of Philip Morris International having an application number of 201280063987.0 discloses an extractor for a smoke product, wherein the extractor is formed by riveting two components, the outer shell is provided with a protrusion to handily fix to a main body, and an inner sleeve is provided with a step to handily engage with an upper end portion of the heating cavity. The extractor needs a relatively large thrust applied upward along the outer shell to realize an unloading process of the cigarette, and after completing the unloading process of the cigarette, the outer shell should be applied with a downward external force to reset, failing to automatically reset. The operating process is excessively complicated, meanwhile increases a risk that the outer shell may get misplaced after unloading the cigarette. Moreover, the temperature of the smoking cup after heating is excessively high and may readily burn the user, greatly lowering the user's smoking experience.

SUMMARY

To solve the above-mentioned problems, the present invention provides an automatically resettable smoking paraphernalia to avoid the complicated operation process of manually extracting and unloading the cigarette and resetting. The whole upper cover assembly is detachable and replaceable, solving the problem that the cigarette extracting and unloading mechanism may burn users and may get misplaced, which improves the smoking experience.

The objective of the present invention is implemented by the following technical solutions.

An automatically resettable smoking paraphernalia includes the following components:

an outer upper shell, wherein the outer upper shell is cylindrical with openings at two ends, the opening at one end is provided with an inner flange, a side wall of the outer upper shell is provided with a pushing key sliding groove;

a smoking cup provided inside the outer upper shell, wherein an outer wall of the smoking cup is provided with an outward protruded annulus, a bottom of the smoking cup is provided with a heating element socket, the bottom or a wall of the smoking cup is provided with an air inlet hole, the wall of the smoking cup is sleeved with a spring, two ends of the spring abut between the inner flange and the outward protruded annulus; and a pushing key, wherein the pushing key includes a pushing key annulus and a pushing key block, the pushing key annulus is engaged with the outward protruded annulus, and the pushing key block is provided inside the pushing key sliding groove.

Preferably, the automatically resettable smoking paraphernalia further includes an outer lower shell. The outer lower shell is detachably connected to the outer upper shell. A heating element is provided inside the outer lower shell, extending in a longitudinal direction. When the outer lower shell and the outer upper shell are assembled, the heating element penetrates through the heating element socket into the smoking cup. The outer lower shell is further internally provided with an electronic core and a power supply switch.

Preferably, the automatically resettable smoking paraphernalia further includes a middle frame decorating component. The middle frame decorating component, the outer upper shell, and the outer lower shell are detachably connected to each other.

Preferably, the middle frame decorating component is cup-shaped. An inner cavity of the middle frame decorating component is a smoking cup holding cavity. An outer side wall of the middle frame decorating component is fixedly provided with a strip-shaped sheet in the longitudinal direction. An outer edge of the strip-shaped sheet has a shape matched with the pushing key sliding groove. An upper part and a lower part of the strip-shaped sheet are respectively provided with a hole. The hole at the upper part of the strip-shaped sheet is a pushing key position for containing the pushing key block. The hole at the lower part of the strip-shaped sheet is a power supply switch position for containing the power supply switch 7.

Preferably, the pushing key sliding groove is a U-shaped notch longitudinally extending along the side wall of the outer upper shell from the other end of the outer upper shell.

Preferably, two outward protruded annuli are provided on the outer side wall of the smoking cup, and the two outward protruded annuli are arranged at an interval in the longitudinal direction. An upper outward protruded annulus is used to abut against the spring. A lower outward protruded annulus is engaged with the pushing key annulus.

Preferably, the detachable connection includes a snap connection, a thread connection, or a pin connection.

Preferably, the outer upper shell is made of a thermal insulation material.

Preferably, an inner wall of the outer upper shell is provided with a protruded strip protruding inward and radially. A reinforcing rib protruding outward and radially is provided between the two outward protruded annuli on the outer wall of the smoking cup. The protruded strip and the reinforcing rib are matched with each other, avoiding rotation of the smoking cup and preventing the smoking cup from detaching longitudinally.

The working principle of the present invention is as below. After finishing smoking using the smoking paraphernalia according to the present invention, the pushing key is pushed by a thumb to move upward, thus driving the smoking cup to move upward. Meanwhile, the spring moves upward and is thereby compressed, till an upper part of the smoking cup protrudes out of the outer upper shell. Owing to an engagement between the protruded strip and the reinforcing rib, a lower part of the smoking cup is tightly held by the outer upper shell, at that time, the smoking cup is incapable of rotating or shifting in an oblique direction, thus the cigarette is readily extracted and unloaded. When the pushing key is released, the spring resets, the smoking cup returns back to its original position, i.e., automatically resetting; at that time, the user can insert the next cigarette for smoking, alternatively, the user may press the power supply switch to turn off the electronic core, thereby the smoking paraphernalia stops working.

The present invention has the following advantages.

(1) The present invention provides an automatically resettable smoking paraphernalia, wherein the smoking cup, the spring, and the outer upper shell can be disassembled and replaced as a whole, so as to conveniently clean the heating element and replace the heating cavity.

(2) The present invention provides an automatically resettable smoking paraphernalia, wherein the bottom of the smoking cup contacts the pushing key, when the pushing key is moved upward, the smoking cup moves upward, the spring is compressed, and the smoking cup protrudes out of the outer upper shell by a distance, so as to readily extract and unload the cigarette; when the pushing key is released, the smoking cup resets with the spring.

(3) The present invention provides an automatically resettable smoking paraphernalia, wherein the smoking cup is hidden inside the outer upper shell to prevent the exposed smoking cup with excessively high temperature from burning the user. Besides, since the smoking cup is limited inside the outer upper shell in the whole using process, the risk that the smoking cup may be detached and misplaced is avoided.

Figure 1:
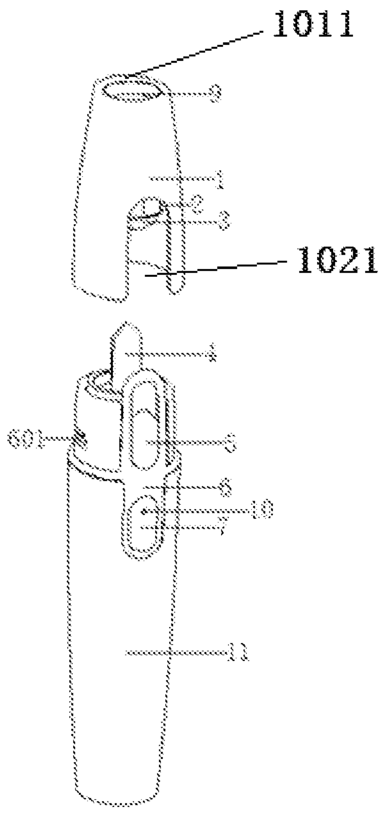
FIG. 1 is a perspective view showing an automatically resettable smoking paraphernalia of the present invention after an outer upper shell thereof is detached.
Figure 2:
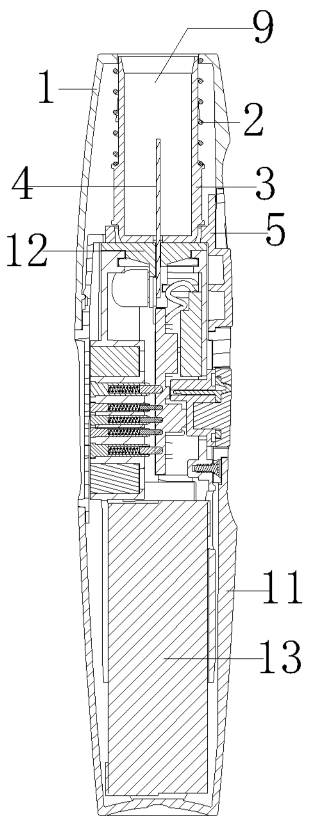
FIG. 2 is a diagram showing an arrangement of components of the automatically resettable smoking paraphernalia of the present invention.
Figure 3:
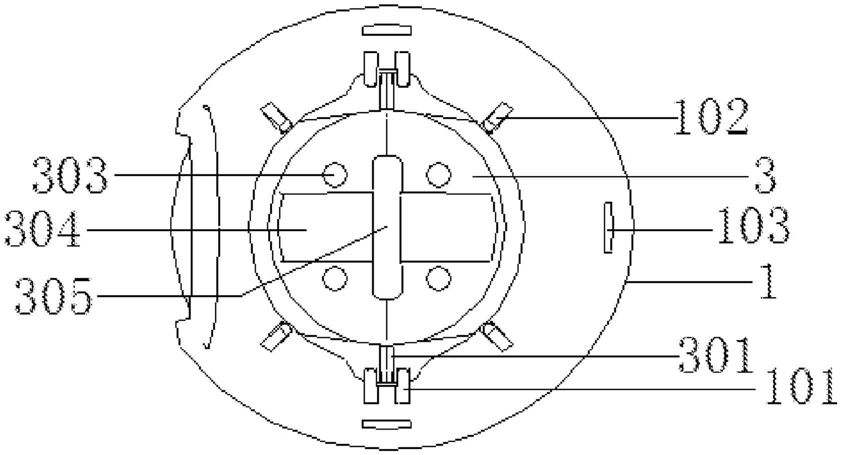
FIG. 3 is a bottom view showing a smoking cup, a spring, and an outer upper shell of the automatically resettable smoking paraphernalia of the present invention as a whole.
Figure 4:
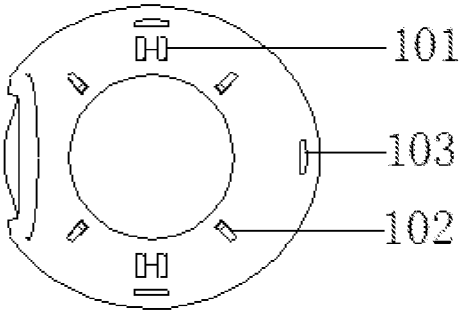
FIG. 4 is a bottom view showing the outer upper shell of the automatically resettable smoking paraphernalia according to the present invention.
Figure 5:
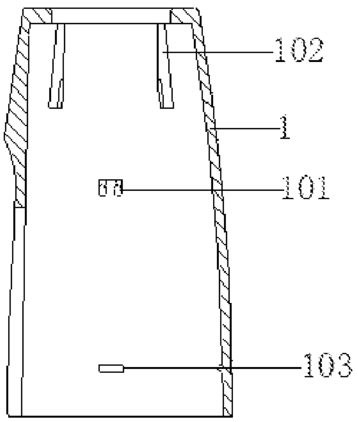
FIG. 5 is a sectional view showing the outer upper shell of the automatically resettable smoking paraphernalia according to the present invention.
Figure 6:
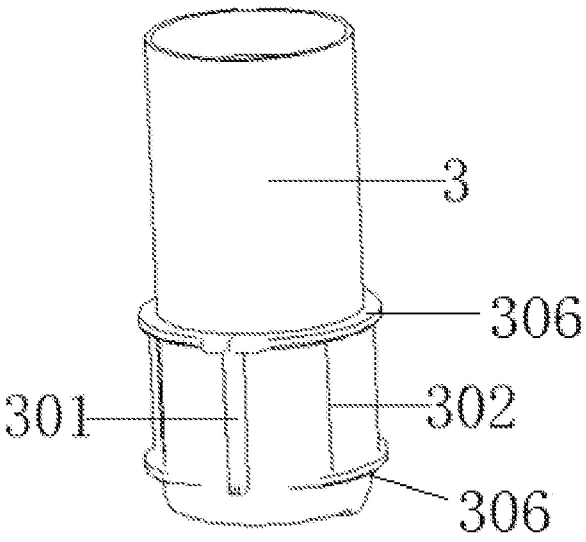
FIG. 6 is a schematic diagram showing a smoking cup of the automatically resettable smoking paraphernalia according to the present invention.
Figure 7:
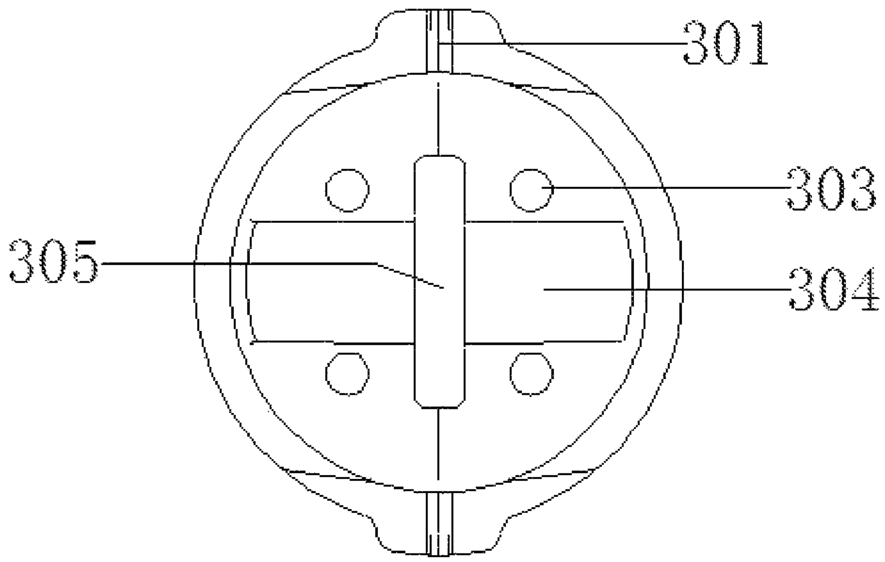
FIG. 7 is a bottom view showing the smoking cup of the automatically resettable smoking paraphernalia according to the present invention.
Figure 8:
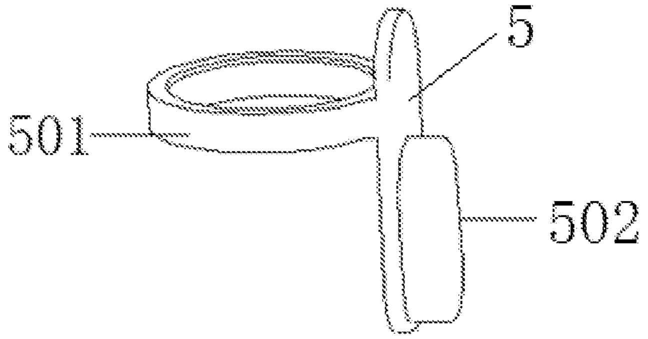
FIG. 8 is a perspective view showing a pushing key of the automatically resettable smoking paraphernalia according to the present invention.
Figure 9:
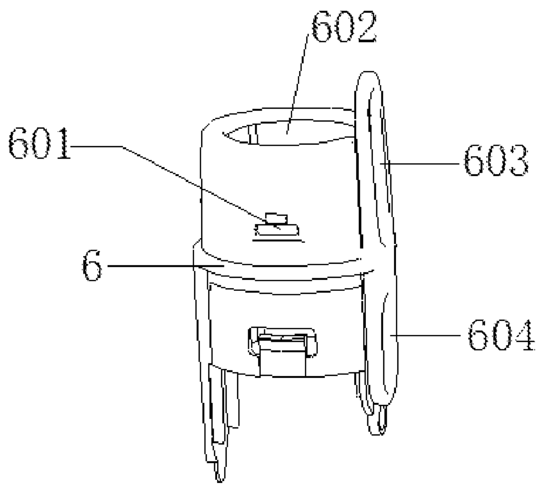
FIG. 9 is a perspective view showing a middle frame decorating component of the automatically resettable smoking paraphernalia according to the present invention.

The reference designators in the drawings are as below: 1: outer upper shell, 2: spring, 3: smoking cup, 4: heating element, 5: pushing key, 6: middle frame decorating component, 7: power supply switch, 9: heating cavity, 10: LED lamb, 11: outer lower shell, 12: heating element fixing base, 13: electronic core, 101: groove, 102: protruded strip, 103: snapping opening, 1011: inner flange, 1021: pushing key sliding groove, 301: protruded block, 302: reinforcing rib, 303: air inlet hole, 304: step, 305: heating element socket, 306: outward protruded annulus, 501: pushing key annulus, 502: pushing key block, 601: fixing groove, 602: smoking cup holding cavity, 603: pushing key position, 604: power supply switch position.

DETAILED DESCRIPTION OF THE EMBODIMENTS

An automatically resettable smoking paraphernalia includes the following components:

the outer upper shell 1, wherein the outer upper shell is cylindrical with openings at two ends, the opening at one end of the outer upper shell is provided with the inner flange 1011, and a side wall of the outer upper shell is provided with the pushing key sliding groove 1021;

the smoking cup 3 provided inside the outer upper shell 1, wherein an outer wall of the smoking cup 3 is provided with the outward protruded annulus 306, a bottom of the smoking cup is provided with the heating element socket 305, the bottom or a wall of the smoking cup is provided with the air inlet hole 303, the wall of the smoking cup is sleeved with the spring 2, and two ends of the spring abut between the inner flange 1011 and the outward protruded annulus 306; and the pushing key 5, wherein the pushing key includes the pushing key annulus 501 and the pushing key block 502, the pushing key annulus 501 is engaged with the outward protruded annulus 306, and the pushing key block 502 is provided inside the pushing key sliding groove 1021.

Preferably, the automatically resettable smoking paraphernalia further includes the outer lower shell 11. The outer lower shell is detachably connected to the outer upper shell 1. The heating element 4 is provided in the outer lower shell, extending in a longitudinal direction. When the outer lower shell 11 and the outer upper shell 1 are assembled, the heating element 4 penetrates through the heating element socket 305 into the smoking cup 3. The outer lower shell 11 is internally provided with the electronic core 13 and the power supply switch 7.

Preferably, the automatically resettable smoking paraphernalia further includes the middle frame decorating component 6. The middle frame decorating component, the outer upper shell 1, and the outer lower shell 11 are detachably connected to each other. The middle frame decorating component 6 is cup-shaped. An inner cavity of the middle frame decorating component is the smoking cup holding cavity 602. An outer side wall of the middle frame decorating component 6 is fixedly provided with a strip-shaped sheet in the longitudinal direction. An outer edge of the strip-shaped sheet has a shape matched with the pushing key sliding groove 1021. An upper part and a lower part of the strip-shaped sheet are respectively provided with a hole. The hole at the upper part of the strip-shaped sheet is the pushing key position 603 for containing the pushing key block 502. The hole at the lower part of the strip-shaped sheet is the power supply switch position 604 for containing the power supply switch 7.

Preferably, the pushing key sliding groove 1021 is a U-shaped notch longitudinally extending along the side wall from the other end of the outer upper shell.

Preferably, two outward protruded annuli are provided on the outer wall of the smoking cup 3, the two outward protruded annuli are arranged at an interval in the longitudinal direction. An upper outward protruded annulus is used to abut against the spring 2. A lower outward protruded annulus is engaged with the pushing key annulus 501.

Preferably, the detachable connection includes a snap connection, a thread connection, or a pin connection.

Preferably, the outer upper shell 1 is made of a thermal insulation material.

Preferably, an inner wall of the outer upper shell 1 is provided with the protruded strip 102 protruding inward and radially, the reinforcing rib 302 protruding outward and radially is provided between the two outward protruded annuli on the outer wall of the smoking cup 3. The protruded strip and the reinforcing rib are matched with each other, avoiding rotation of the smoking cup and preventing the smoking cup from detaching longitudinally.

The working principle of the present invention is as below: when the smoking paraphernalia of the present invention is used for smoking, the cigarette can be directly inserted. The electronic core can be turned on by pressing the power supply switch 7 for smoking.

After finishing smoking, when the pushing key 5 is pushed by a thumb to move upward, the smoking cup 3 is driven to move upward. At the same time, the spring 2 moves upward and is thereby compressed, till the upper part of the smoking cup 3 protrudes out of the outer upper shell 1. Since the protruded strip 102 is engaged with the reinforcing rib 302, a lower part of the smoking cup 3 is tightly held by the outer upper shell 1. At that time, the smoking cup 3 is incapable of rotating or shifting in an oblique direction, so as to readily extract or unload the cigarette. When the pushing key 5 is released, the spring 2 resets, and the smoking cup 3 returns to its original position, i.e., automatically resetting. At that time, a next cigarette can be inserted for smoking. Alternatively, the power supply switch 7 can be pressed to turn off the electronic core, thereby the smoking paraphernalia stops working.

What is claimed is:

1. An automatically resettable smoking paraphernalia, comprising the following components:

an outer upper shell, wherein a side wall of the outer upper shell is provided with a pushing key sliding groove, and an inner wall of the outer upper shell is provided with a protruded strip;

a smoking cup provided inside the outer upper shell, wherein an outer wall of the smoking cup is provided with two outward protruded annuli, a reinforcing rib is provided between the two outward protruded annuli on the outer wall of the smoking cup, a bottom of the smoking cup is provided with a heating element socket, and the outer wall of the smoking cup is sleeved with a spring; and a pushing key, wherein the pushing key comprises a pushing key annulus and a pushing key block, the pushing key annulus is engaged with one of the two outward protruded annuli, and the pushing key block is provided inside the pushing key sliding groove;

wherein the protruded strip and the reinforcing rib are matched with each other, wherein when the pushing key is pushed upward, the smoking cup is moved upward, which causes the spring to move upward and be compressed, and when the pushing key is pushed until an upper part of the smoking cup protrudes out of the outer upper shell, the protruded strip engages with the reinforcing rib, which causes a lower part of the smoking cup tightly held by the outer upper shell and locks the smoking cup from rotating or shifting in an oblique direction; and when the pushing key is released, the spring resets the smoking cup to an original position.

2. The automatically resettable smoking paraphernalia according to claim 1, further comprising an outer lower shell, wherein the outer lower shell is detachably connected to the outer upper shell, a heating element is provided in the outer lower shell, and the heating element is configured to penetrate through the heating element socket into the smoking cup.

3. The automatically resettable smoking paraphernalia according to claim 2, wherein the outer lower shell is further internally provided with an electronic core and a power supply switch.

4. The automatically resettable smoking paraphernalia according to claim 2, further comprising a middle frame decorating component, wherein the middle frame decorating component, the outer upper shell, and the outer lower shell are detachably connected to each other.

5. The automatically resettable smoking paraphernalia according to claim 4, wherein the middle frame decorating component is cup-shaped, an inner cavity of the middle frame decorating component is a smoking cup holding cavity, an outer side wall of the middle frame decorating component is fixedly provided with a strip-shaped sheet, an outer edge of the strip-shaped sheet has a shape matched with the pushing key sliding groove, an upper part of the strip-shaped sheet and a lower part of the strip-shaped sheet are respectively provided with a hole, the hole at the upper part of the strip-shaped sheet is a pushing key position for containing the pushing key block, the hole at the lower part of the strip-shaped sheet is a power supply switch position for containing a power supply switch.

6. The automatically resettable smoking paraphernalia according to claim 4, wherein the middle frame decorating component, the outer upper shell, and the outer lower shell are detachably connected to each other with a snap connection, a thread connection, or a pin connection.

7. The automatically resettable smoking paraphernalia according to claim 1, the bottom of the smoking cup is provided with an air inlet hole.

8. The automatically resettable smoking paraphernalia according to claim 1, a wall of the smoking cup is provided with an air inlet hole.

9. The automatically resettable smoking paraphernalia according to claim 1, wherein the outer upper shell is cylindrical with openings at two ends, the opening at a first end of the outer upper shell is provided with an inner flange.

10. The automatically resettable smoking paraphernalia according to claim 9, wherein the pushing key sliding groove is a U-shaped notch extending along the side wall of the outer upper shell from a second end of the outer upper shell.

11. The automatically resettable smoking paraphernalia according to claim 1, wherein the two outward protruded annuli are arranged at an interval in a longitudinal direction, an upper outward protruded annulus of the two outward protruded annuli is configured to abut against the spring, and a lower outward protruded annulus of the two outward protruded annuli is configured to engage with the pushing key annulus.

12. The automatically resettable smoking paraphernalia according to claim 1, wherein the outer upper shell is made of a thermal insulation material.

* * * * *